United States Patent Office 3,738,994
Patented June 12, 1973

3,738,994
2-CYANO-POLYHALOBENZIMIDAZOLES
Michael H. Fisher, Somerville, N.J., assignor to
Merck & Co., Inc., Rahway, N.J.
No Drawing. Original application Sept. 26, 1969, Ser. No. 861,452, now abandoned. Divided and this application Aug. 13, 1971, Ser. No. 171,749
Int. Cl. C07d 49/38
U.S. Cl. 260—309.2                2 Claims

ABSTRACT OF THE DISCLOSURE

Trihalo- and tetrahalobenzimidazoles having at the 2-position a substituent selected from the group consisting of cyano, thiocarbamoyl, loweralkylmercapto, loweralkylsulfonyl and 2-thiazolin-2-yl are active as anthelmintics, coccidiostats and as pesticides.

---

This application is a division of copending application Ser. No. 861,452, filed Sept. 26, 1969, now abandoned.

This invention relates to new compositions of matter classifiable in the field of organic chemistry as 2-substituted trihalo- and tetrahalobenzimidazoles. More particularly, this invention relates to trihalo- and tetra-halobenzimidazoles having at the 2-position a substituent selected from the group consisting of cyano, thiocarbamoyl, loweralkylmercapto, loweralkylsulfonyl and 2-thiazolin-2-yl; to methods for preparing such benzimidazoles and to anthelmintic, anticoccidial and agricultural formulations containing such benzimidazoles as the essential active ingredient.

In its composition aspect, therefore, the instant invention may be described as residing in the concept of 2-substituted benzimidazoles having the formula:

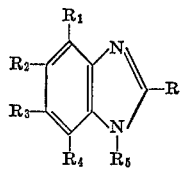

wherein R is a member selected from the group consisting of cyano, thiocarbamoyl and the N-loweralkyl and N,N-di-loweralkyl derivatives thereof, loweralkylmercapto, loweralkylsulfonyl and 2-thiazolin-2-yl; $R_1$, $R_2$, $R_3$ and $R_4$ are members selected from the group consisting of hydrogen and halogen selected from the group consisting of fluorine, chlorine, bromine and iodine, provided that only one of $R_1$, $R_2$, $R_3$ and $R_4$ can be hydrogen; and $R_5$ is a member selected from the group consisting of hydrogen, loweralkyl, loweralkoxyloweralkyl, loweralkenyl, carboxyloweralkyl and loweralkylesters thereof, loweralkanoyl aminoloweralkyl and the N-loweralkyl and N,N-diloweralkyl derivatives thereof and, where R is cyano, a member of the group consisting of hydroxy, loweralkoxy, carboxyloweralkoxy and loweralkylesters thereof, sulfoloweralkoxy and aminoloweralkoxy containing from 2 to 6 carbon atoms in the alkoxy moiety and the N-loweralkyl and N,N-diloweralkyl derivatives thereof, and alkali metal, alkaline earth metal and pharmaceutically acceptable amine salts thereof when $R_5$ is hydrogen; alkali metal, alkaline earth metal and pharmaceutically acceptable amine salts thereof when $R_5$ is carboxyloweralkyl, carboxyloweralkoxy, or sulfoloweralkoxy; and salts thereof with pharmaceutically acceptable acids when $R_5$ is aminoloweralkyl or aminoloweralkoxy.

As used above, the terms, loweralkyl, loweralkoxy and loweralkanoyl are intended to include both straight and branched chain loweralkyl, loweralkoxy and loweralkanoyl groups containing, unless otherwise specified, from 1 to 6 carbon atoms in the alkyl, alkoxy or alkanoyl moiety. Typical of such loweralkyl, loweralkoxy and loweralkanoyl groups are, for example, methyl, ethyl, propyl, isopropyl, n-butyl, amyl, n-hexyl, methoxy, ethoxy, propoxy, isobutoxy, formyl, acetyl, propionyl, isobutyryl and n-hexanoyl. The term, loweralkenyl, is intended to include both straight and branched chain loweralkenyl groups containing from 2 to 6 carbon atoms in the alkenyl moiety such as, for example, vinyl, allyl, propenyl, crotyl, isobutenyl and allenyl. The terms, alkali metal salt and alkaline earth metal salt, are intended to include salts of alkali and alkaline earth metals such as for example, lithium, sodium, potassium, cesium, calcium, magnesium, barium and strontium. Pharmaceutically acceptable amine salts will include those derived from amines such as, for example, ammonia, ethanolamine, diethanolamine, guanidine, arginine, lysine, ethylenediamine, piperazine and morpholine. Typical pharmaceutically acceptable acid salts will include those derived from inorganic and organic acids such as hydrochloric acid, sulfuric acid, phosphoric acid, acetic acid, valeric acid, lactic acid, caproic acid, aspartic acid, glutamic acid, citric acd and tartaric acid.

The instant invention is based upon applicant's discovery that the 2-substituted benzimidazoles described above show inherent applied use characteristics as anthelmintic agents, particularly against Haemonchus sp., Chabertia sp., and Oesophagostomum sp., as anticoccidial agents and as pesticides (e.g. herbicides and bactericides). The physiological activity of the 2-substituted benzimidazoles of this invention has been confirmed by standard laboratory techniques. It is contemplated that formulations containing the 2-substituted benzimidazoles of this invention as the essential active ingredient will be employed in the treatment and control of heliminthasis and coccidiosis and as pesticides.

The novel benzimidazoles of this invention wherein the substituent at the 2-position is cyano and the 1-position is unsubstituted may be prepared readily by employing as the starting material a trihalo o-phenylenediamine or tetrahalo o-phenylene diamine. According to one method for preparing these 2-cyano benzimidazoles, the trihalo or tetrahalo o-phenylenediamine is cyclized by treatment with acetic acid in the presence of an alkali metal acetate to form the corresponding 2-methylbenzimidazole. The reaction is usually carried out at reflux and generally requires from 18 to 24 hours for completion. The product may be recovered by evaporation of the reaction mixture and the residue, after washing with water may be purified by conventional recrystallization from an organic solvent.

The trihalo or tetrahalo 2-methylbenzimidazole so produced is then treated with benzaldehyde to form the corresponding 2-styrylbenzimidazole. The reaction conveniently is carried out by treating the 2-methylbenzimidazole with benzaldehyde in the presence of a small quantity of pyridine in a sealed tube at a temperature of about 175 to 225° C. After about 18 to 24 hours the reaction mixture is evaporated and the crude 2-styrylbenzimidazole may be purified, if desired, by recrystallization.

As the next step in the synthesis, the trihalo or tetrahalo 2-styrylbenzimidazole prepared above is converted into the corresponding 2-formylbenzimidazole by treatment with osmium tetroxide in the presence of sodium metaperiodate and an aqueous organic solvent. The reaction may be carried out at room temperature and is usually complete in about 20 to 30 hours. The reaction mixture is evaporated and the residue is dissolved in water. The desired trihalo or tetrahalo 2-formylbenzimidazole may be recovered from the aqueous solution by extraction with a suitable solvent such as methylene chloride followed by evaporation.

Alternatively, the 2-formyl compound can be obtained directly from the 2-methylbenzimidazole prepared in the first step of the synthesis by oxidation using selenium dioxide in the presence of acetic acid. The reaction mixture is refluxed for about 3 to 6 hours and the product may be recovered by evaporation followed by conventional purification of the residue.

The next step in the synthesis invlves conversion of the trihalo or tetrahalo 2-formylbenzimidazole into the corresponding 2-formylbenzimidazole oxime. This may be achieved by treating the 2-formylbenzimidazole with hydroxylamine in the presence of pyridine. The reaction mixture is heated at about 75 to 125° C. for 1 to 3 hours and the product may be recovered by evaporation of the reaction mixture followed by conventional purification techniques.

Finally, the desired trihalo or tetrahalo 2-cyanobenzimidazole may be obtained from the 2-formylbenzimidazole oxime prepared above by refluxing a solution of the oxime and thionyl chloride for about 1 to 3 hours. The product may be recovered by evaporation of the reaction mixture followed by conventional purification of the residue.

The trihalo and tetrahalobenzimidazole 2-cyanobenzimidazoles of this invention wherein the 1-position is unsubstituted also may be prepared by treating the trihalo or tetrahalo o-phenylenediamine starting material with phosgene in order to form the corresponding 2-benzimidazolone. The reaction is carried out by passing phosgene into an acetic acid solution of the o-phenylenediamine. Addition of water to the reaction mixture precipitates the 2-benzimidazolone product which may be recovered by filtration and, without further purification, refluxed with phosphorus oxychloride to form the corresponding trihalo or tetrahalo 2-chlorobenzimidazole. The chlorination is usually complete in about 18 to 24 hours. The 2-chlorobenzimidazole may be recovered by evaporation of the reaction mixture and purified by conventional recrystallization.

The chlorine substituent at the 2-position may be selectively replaced with the desired cyano group by reaction with sodium cyanide. Applicants have found, however, that in order for this reaction to proceed satisfactorily it is necessary first to introduce a substituent at the 1-position. Conveniently, this may be achieved by treating the 2-chlorobenzimidazole with chloromethyl methyl ether in the presence of an alkali metal alkoxide to form the corresponding 1-methoxymethyl-2-chlorobenzimidazole. Substituents other than the methoxymethyl group such as, for example, loweralkyl groups, carboxy-loweralkyl groups and loweralkanoyl groups may be introduced, if desired, by conventional techniques and these groups serve equally as well to block the 1-position during replacement of the 2-chloro substituent.

It will be appreciated by those skilled in the art that in the case of trihalo benzimidazoles, derived as described above from the corresponding trihalo o-phenylenediamine starting material, addition of the blocking substituent at the 1-position destroys the symmetry of the benzimidazole nucleus so that the product of the reaction is obtained as a mixture of isomers. Thus, for example, 2,4,5,7-tetrachlorobenzimidazole, which may be prepared by treating 3,4,6-trichloro-o-phenylenediamine with phosgene to obtain 4,5,7-trichloro-2-benzimidazolone followed by chlorination of this compound with phosphorus oxychloride according to the techniques described above, upon treatment with chloromethyl methylether yields a mixture of 1-methoxymethyl-2,4,5,7-tetrachlorobenzimidazole and 1-methoxymethyl-2,4,6,7 - tetrachlorobenzimide. Although unnecessary to the subsequent synthesis of the 2-cyano benzimidazoles of this invention, this mixture of isomers may be separated, if desired, by conventional chromatographic techniques. Conveniently, chromatography is carried out over silica gel using a mixture of organic solvents such as 20% etherpetroleum benzin as the eluant.

Treatment of the 1-methoxymethyl trihalo or tetrahalo 2-chlorobenzimidazole intermediate with sodium cyanide selectively replaces the 2-chloro group with the desired cyano group yielding the corresponding 1-methoxymethyl trihalo or tetrahalo 2-cyanobenzimidazole which, upon heating at about 75 to 125° C. for 1 to 2 hours in the presence of pyridine hydrochloride, removes the 1-methoxymethyl substituent thus producing the desired trihalo or tetrahalo 2-cyanobenzimidazole.

As a further alternative, the tetrahalo 2-cyanobenzimidazoles of this invention wherein the 1-position is unsubstituted may be prepared from known 2-trichloromethylbenzimidazole by halogenation following treatment of the 2-trichloromethyl-4,5,6,7-tetrahalobenzimidazole so produced with ammonia. Halogenation may be carried out in any convenient manner such as, for example, by passing gaseous halogen through an acetic acid solution of the 2-trichloromethylbenzimidazole. The reaction mixture may be heated to about 50 to 100° C. and the reaction is usually complete in about 4 to 6 hours. The tetrahalogenated product may be recovered by conventional techniques and is then treated with concentrated aqueous ammonia for about 5 to 15 minutes at room temperature to obtain the ammonium salt of 2-cyano-4,5,6,7-tetrahalobenzimidazole. The free benzimidazole then may be obtained by acidifying an aqueous suspension of the ammonium salt.

The trihalo and tetrahalo benzimidazoles of this invention wherein the substituent at the 2-position is 2-thiazolin-2-yl and wherein the 1-position is unsubstituted may be prepared readily by treating known trihalo 2-trichloromethylbenzimidazoles, or tetrahalo 2-trichloromethylbenzimidazoles as prepared above, with 2-mercaptoethylamine in the presence of an alkali metal alkoxide and a suitable organic solvent. Conveniently, the reaction is run at about room temperature and is usually complete within about 24 hours. The product may be recovered by conventional techniques for a methylene chloride extract of the residue remaining after evaporation of the solvent from the reaction mixture.

The trihalo and tetrahalo benzimidazoles of this invention wherein the 2-substituent is loweralkylmercapto and wherein the 1-position is unsubstituted may be prepared from trihalo o-phenylenediamines or tetrahalo o-phenylenediamines by treating the o-phenylenediamines starting material with thiophosgene in acetic acid to form the corresponding trihalo or tetrahalo 2-mercaptobenzimidazole. This reaction proceeds satisfactorily at room temperature and is rapid, usually being complete within 10 to 15 minutes. After pouring the reaction mixture over ice water it may be recovered and purified by conventional techniques. Treatment of the trihalo or tetrahalo 2-mercaptobenzimidazole so produced with a loweralkyl halide, such as a loweralkyl iodide at reflux, in the presence of aqueous sodium hydroxide, yields the corresponding 2-loweralkylmercapto to benzimidazole. Acidification of the cooled reaction mixture precipitates the product which may be recovered and purified by recrystallization.

The trihalo and tetrahalo 2-loweralkylmercapto benzimidazoles prepared above may be converted into the corresponding 2-loweralkylsulfonylbenzimidazoles of this invention by oxidation with an organic peracid such as peracetic acid, trifluoro peracetic acid, m-chloro perbenzoic acid and the like. The reaction is carried out at room temperature in a suitable organic solvent. Evaporation of the solvent, after stirring for 1 to 2 hours, followed by treatment of the residue with aqueous sodium bicarbonate yields the product which may be recovered and purified by conventional techniques.

Those trihalo and tetrahalo benzimidazoles of this invention wherein the substituent at the 2-position is thiocarbamoyl and wherein the 1-position is unsubstituted may be obtained by employing the trihalo and tetrahalo 2-cyanobenzimidazoles, as prepared above, as the starting material. Applicant has found that when a trihalo or tetrahalo 2-cyanobenzimidazole is treated with hydrogen sulfide gas in the presence of trimethylamine, it is converted directly into the corresponding 2-thiocarbamoyl benzimidazole. Conveniently, the reaction is run at room temperature and, after saturation with hydrogen sulfide gas, the reaction mixture is allowed to stand for 3 to 6 days prior to conventional recovery and purification of the product.

The N-loweralkyl and N,N-diloweralkyl analogs of the above triahlo and tetrahalo 2-thiocarbamoylbenzimidazoles also may be prepared from trihalo and tetrahalo 2-cyanobenzimidazole starting materials. The preparation involves first saturating a solution of the 2-cyanobenzimidazole in the presence of a loweralkanol at about −10° to 5° C. with hydrogen chloride gas to form the corresponding trihalo or tetrahalo 2-formimidobenzimidazole loweralkyl ester. After about 1–3 hours, the product is recovered by filtration and, without further purification, is dissolved in a suitable organic solvent and the solution is saturated with hydrogen sulfide gas at room temperature. Addition of a loweralkylamine or a diloweralkylamine results in the formation of the corresponding trihalo or tetrahalo 2-(N-loweralkylthiocarbamoyl) benzimidazole or 2-(N,N-diloweralkylthiocarbamoyl) benzimidazole, respectively.

As indicated above, the trihalo and tetrahalo 2-R-benzimidazoles of this invention also may be substituted at the 1-position. The 1-substituted benzimidazole may be prepared in a variety of ways including direct substitution of the parent benzimidazole and, where the 1-substituent is hydroxy or its derivatives and the 2-substituent is cyano, cyclization of a trihalo or tetrahalo o-nitro acetanilide. It is again pointed out that addition of a 1-substituent to the trihalo benzimidazoles of this invention destroys the symmetry of the benzimidazole nucleus so that the product is obtained as a mixture of isomers which may be separated, if desired, by chromatographic techniques as described above. Synthesis from O-nitroacetanilide starting materials, however, is specific leading to the preparation of the individual isomers.

The 1-loweralkanoyl trihalo or tetrahalo 2-R-benzimidazoles of this invention are prepared readily by conventional acylation of the parent trihalo or tetrahalo 2-R-benzimidazole. Conveniently the reaction is carried out by treating a solution of the benzimidazole in a suitable organic solvent with a loweralkanoyl anhydride in the presence of an alkali metal salt of a loweralkanoic acid. The reaction is usually heated at about 80 to 120° C. for 3 to 6 hours and the product precipitated by the addition of water.

Introduction of a loweralkyl, loweralkenyl or loweralkoxyloweralkyl group at the 1-position may be achieved by treating a solution of the trihalo or tetrahalo 2-R-benzimidazole in a suitable organic solvent with a loweralkyl halide, a loweralkenyl halide, or a haloloweralkyl loweralkyl ether, respectively, in the presence of a base such as an alkali metal alkoxide, an alkali metal hydroxide or sodium hydride. The reaction may be carried out at temperatures ranging from room temperature to reflux and is usually complete in about 3 to about 30 hours. The 1-loweralkyl, 1-loweralkenyl and 1-loweralkoxyloweralkyl trihalo or tetrahalo 2-R-benzimidazoles so produced then may be recovered and purified by conventional techniques.

The same reaction may be employed to introduce a carboxyloweralkyl loweralkyl ester group at the 1-position. In this case, the trihalo or tetrahalo 2-R-benzimidazole is treated with a loweralkyl ester of haloloweralkanoic acid. The reaction, otherwise, is carried out in the same manner as described above. Conventional alkaline hydrolysis of this trihalo or tetrahalo 2-R-benzimidazole 1-carboxyloweralkyl loweralkyl esters so produced converts these compounds into the corresponding 1-carboxyloweralkyl-2-R-benzimidazoles of this invention. The hydrolysis, conveniently, may be carried out by stirring a suspension of the ester in an alkali metal hydroxide until a clear solution is formed. Acidification of the solution precipitates the product which may be recovered and purified by conventional techniques.

The same reaction also may be employed to introduce a N,N-diloweralkylaminoloweralkyl group at the 1-position by treating the trihalo or tetrahalo 2-R-benzimidazole with a N,N-diloweralkylaminoloweralkyl halide. The reaction is carried out in the manner described above and the product is recovered and purified by conventional techniques.

The 1 - N - loweralkylaminoloweralkyl group may be introduced by treating the trihalo or tetrahalo 2-R-benzimidazole with a haloloweralkanol in the manner described above to prepare the corresponding 1-hydroxyloweralkyl-2-R-benzimidazole which then may be treated with thionylchloride to form the corresponding 1-chloroloweralkyl-2-R-benzimidazole. Reaction between this compound and a loweralkylamine produces the desired trihalo or tetrahalo 1-N-loweralkylaminoloweralkyl-2-R-benzimidazole.

The trihalo and tetrahalo 1 - aminoloweralkyl - 2 - R-benzimidazoles of this invention may be prepared by treating the trihalo or tetrahalo 2-R-benzimidazole in the presence of a base, in the manner described above, with a N-haloloweralkylphthalimide to produce the corresponding 1-(N-phthalimidoloweralkyl) - 2 - R - benzimidazole which, upon treatment with hydrazine hydrate, is converted into the desired 1-aminoloweralkyl-2-R-benzimidazole. The 1-(N-phthalimidoloweralkyl) - 2 - R-benzimidazole is a suitable organic solvent is refluxed in the presence of hydrazine hydrate for 1 to 2 hours. Evaporation of the solvent followed by extraction with dilute mineral acid and subsequent basification of the acid extract precipitates trihalo or tetrahalo 1-aminoloweralkyl-2-R-benzimidazole which is recovered by conventional techniques.

As noted above, the trihalo and tetrahalo benzimidazoles of this invention wherein the 2-substituent is cyano and the 1-substituent is hydroxy may be prepared by employing a trihalo or tetrahalo o-nitroacetanilide as the starting material. The first step in this synthesis involves cyclizing the o-nitroacetanilide in an aqueous alkali metal hydroxide with sodium dithionite to form the corresponding trihalo or tetrahalo 1-hydroxy-2-methylbenzimidazole. The cyclization may be carried out at temperatures between about 25 to about 45° C. and the reaction mixture is stirred for 40 to 50 hours. Acidification of the reaction mixture precipitates the product which may be purified by conventional recrystallization.

The trihalo or tetrahalo 1-hydroxy-2-methylbenzimidazole prepared above then may be converted into the corresponding 1-hydroxy-2-cyanobenzimidazole by the same sequence of steps as described previously for the conversion of a trihalo or tetrahalo 2-methylbenzimidazole to the corresponding 2-cyanobenzimidazole. Thus, the 1-hydroxy-2-methylbenzimidazole may be treated with benzaldehyde to prepare the corresponding 1-hydroxy-2-styrylbenzimidazole which then is treated with osmium tetroxide to obtain the corresponding 1-hydroxy-2-formylbenzimidazole. This compound, in the presence of hydroxylamine hydrochloride, then is converted into the corresponding 1-hydroxy - 2 - formyl-benzimidazole oxime which then is treated with thionyl chloride to form the desired trihalo or tetrahalo 1-hydroxy-2-cyanobenzimidazole. Each of these reactions is carried out, and the products are recovered in the manner previously described.

Various additional substituents now can be added to the 1-position by subjecting the trihalo or tetrahalo 1-hydroxy-2-cyanobenzimidazole prepared above to the same type of reaction previously described for the introduction of a loweralkyl, loweralkenyl, loweralkoxyloweralkyl, etc., group at the 1-position. Thus, a trihalo or tetrahalo 1-hydroxy-2-cyanobenzimidazole in a suitable organic solvent and in the presence of a base may be treated with a loweralkyl halide, a haloloweralkanoic acid (preferably in the form of an alkali metal salt), a loweralkyl ester of a halolmeralkanoic acid, a haloloweralkylsulfonic acid (preferably in the form of an alkali metal salt), or a diloweralkylaminoloweralkyl halide to produce the corresponding trihalo or tetrahalo 1-loweralkoxy-, 1-carboxyloweralkoxy-, 1-carboxyloweralkoxyloweralkyl ester, 1-sulfoloweralkoxy or 1-diloweralkylaminoloweralkoxy-2-cyanobenzimidazole, respectively. The 1 - aminoloweralkoxy and the 1-loweralkylaminoloweralkoxy groups may be introduced by treating the 1-hydroxybenzimidazole in the same manner already described for introducing the 1-aminoloweralkyl and 1-loweralkylaminoloweralkyl groups.

Applicant has found that the trihalo and tetrahalo benzimidazoles of this invention wherein the 1-substituent is hydrogen behave as acids and will form salts with alkali metals, alkaline earth metals and pharmaceutically acceptable amines. Similar salts may be formed when the 1-substituent is of acidic character (i.e. carboxyloweralkyl, carboxyloweralkoxy or sulfoloweralkoxy). When the benzimidazoles of this invention bear a substituent of basic character at the 1-position they will form salts with pharmaceutically acceptable acid. Many of these salts display greatly enhanced solubility as compared with the parent benzimidazole and are highly useful in applications where water soluble formulations are desired. These salts may be formed by conventional techniques such as, for example, by contacting the benzimidazole with the desired acid or base followed by evaporation of the reaction mixture and conventional recovery and purification of the salt.

When the trihalo and tetrahalo benzimidazoles of this invention are employed for the treatment and control of helminthasis, the specific means employed for administering the benzimidazole to the animal is not critical and any of the methods now used or available for treating animals infected with, or susceptible to infection by helminths are satisfactory. Where it is desired to administer the benzimidazole in dry, solid unit dosage form, capsules, boluses or tablets containing the desired amount of benzimidazole usually are employed. These dosage forms are prepared by intimately and uniformly mixing the active ingredient with suitable finely divided diluents, fillers, disintegrating agents and/or binders such as starch, lactose, talc, magnesium stearate, vegetable gums and the like. Such unit dosage formulations may be varied widely with respect to their total weight and content of anthelmintic agent depending upon factors such as the type of host animal to be treated, the severity and type of infection and the weight of the host. For large animals such as sheep, swine and cattle, unit dosages up to 15 gm., containing from 3 to 12 gm. of benzimidazole, may be employed. It is usually preferred, however, to employ unit dosages weighing from 5 to 10 gm. containing from 2 to 8 gm. of benzimidazole. Boluses as well as smaller size tablets contain various binders and lubricants and are compounded by techniques well-known in the art. Capsules are prepared readily by mixing the active ingredient with a diluent such as starch or lactose and filling into the capsule.

In order to treat infected animals by means of a drench, the trihalo and tetrahalo benzimidazoles of this invention are mixed with a suspending agent such as bentonite and the solid mix is added to water just prior to administration. Alternatively, ready to use drench formulations, such as those described in U.S. Pat. No. 2,918,403, may be employed. Preferred drench formulations contain from about 5 to 50% by weight of the benzimidazole.

The trihalo and tetrahalo benzimidazoles described herein also may be administered as a component of the feed of the animals or may be dissolved or suspended in the drinking water. Such compositions comprise the benzimidazole intimately dispersed in an inert carrier of diluent. By inert carrier, is meant one that will not react with the benzimidazole and one that may be administered safely to animals. Preferably, the carrier is one that is, or may be, an ingredient of the animal ration.

Suitable compositions include feed supplements in which the active ingredient is present in relatively large amounts and which are suitable for addition to the feed either directly or after an intermediate dilution or blending step. Typical carriers or diluents suitable for such compositions include, for example, distillers' dried grains, corn meal, citrus meal, fermentation residues, ground oyster shells, wheat shorts, molasses solubles, corn cob meal, edible bean mill feed, soya grits, crushed limestone and the like. The active benzimidazoles are intimately dispersed throughout the carrier by methods such as grinding, stirring, milling or tumbling. Compositions containing from about 5 to 50% by weight of the benzimidazole are particularly suitable as feed additives.

Examples of typical feed supplements containing the trihalo and tetrahalo benzimidazoles of this invention dispersed in a solid carrier are:

(A)

| | Lbs. |
|---|---|
| 2-cyano-4,5,7-trichlorobenzimidazole | 20 |
| Corn distiller's dried grains | 80 |

(B)

| | |
|---|---|
| 2-cyano-4,5,6,7-tetrachlorobenzimidazole | 5 |
| Wheat standard middling | 95 |

(C)

| | |
|---|---|
| 2-methylmercapto-4,5,7-trichlorobenzimidazole | 35 |
| Wheat shorts | 65 |

(D)

| | |
|---|---|
| 2-thiocarbamoyl-4,5,6-tribromobenzimidazole | 50 |
| Corn distiller's grains | 50 |

These, and similar feed supplements, are prepared by uniformly mixing the benzimidazole with the carrier.

Such supplements are added to the animal feed in an amount to give the finished feed the concentration of benzimidazole desired for the treatment and control of helminthiasis. Although the desired concentration of active will vary depending upon the factors previously mentioned as well as upon the particular benzimidazole employed, the trihalo and tetrahalo benzimidazoles of this invention are usually fed at concentrations of between 0.5 to 2.0% in the feed in order to achieve the desired anthelmintic result.

As indicated above, the trihalo and tetrahalo benzimidazoles of this invention also may be employed for the prevention and treatment of poultry coccidiosis by administering them to poultry susceptible to or infected with coccidis. This is accomplished normally by incorporating the benzimidazole in the feed or the drinking water of the birds. In terms of the total feed or liquid intake of the poultry, only minor amounts of benzimidazole are necessary for satisfactory control of the coccidial infection.

The preferred dose levels of the trihalo or tetrahalo benzimidazole required for prevention of coccidiosis in poultry will vary to some degree depending upon the specific compound employed as well as the type and severity of the coccidial infection. In some instances, for example, a good control of E. maxima infection is obtained by administering to the poultry a finished feed containing from about 0.003% to about 0.03% by weight of drug. For best results, however, it is preferred to administer the compounds at levels of from about 0.005% to about 0.25% by weight of the feedstuff. It will be appreciated by those skilled in this art that the lowest levels consonant with fully adequate control of coccidiosis and the development of immuntiy will be employed in most instances in order to eliminate as far as possible any risk of side effects that might be induced on prolonged feeding of unnecessarily high levels of drug. The finished feed in which the benzimidazole is employed is a nutritionally adequate one containing sources of carbohydrate, protein, fat, vitamins, minerals and other nutritional factors commonly employed in commercial poultry raising.

The new compounds described herein are also usefully employed as coccidiostats when administered by way of the drinking water of infected animals. The preferred dose levels in the drinking water are usually somewhat less than those employed in a solid feed inasmuch as poultry drink about twice as much as they eat. Administration of these anticoccidial substances in the drinking water is of advantage when using the compounds therapeutically. It is convenient to prepare dispersible or water-soluble powders in which the benzimidazole intimately dispersed in a suitable carrier such as dextrose or sucrose at concentrations of from about 0.3% to about 25% by weight. These solids may then be conveniently added to the drinking water by the poultry raisers.

In addition to poultry feeds containing a minor amount of the trihalo and tetrahalo benzimidazoles of this invention as an effective anticoccidial agent, these compounds also may be formulated into poultry feed supplement compositions wherein the benzimidazole is intimately dispersed in or admixed with a suitable solid non-toxic diluent or carrier. The carrier vehicle employed in those supplement compositions should be one in which the benzimidazole is stable, which is compatible with a finished poultry feed and which can be administered with safety to the animals. These feed supplements, which contain a significantly higher percentage of benzimidazole than does the finished feed, are mixed with or blended into the feedstuff. In order to assure uniform distribution of the coccidiostat in the finished feed, it is customary to employ an intermediate dilution step in which the supplement is blended with a portion of the final feed, and this "intermediate mix" is then added to the remainder of the feed with adequate mixing. The benzimidazoles described hereinabove may be formulated into food supplement compositions containing from about 1 to about 30% by weight of drug. It is preferred in the industry to use from about 1–5 pounds of such a supplement per ton of feedstuff. It will, therefore, be appreciated that the preferred supplement concentration will depend to a large extent on the final use level desired. With the benzimidazoles of this invention, feed supplement compositions containing from about 5–25% by weight of active ingredients are quite suitable.

The diluents normally employed for those poultry feed supplements are solid orally ingestible poultry feed additives such as distiller's dried grains, corn meal, citrus meal, fermentation residues, ground oyster shells, Attapulgus clay, wheat middlings, wheat shorts, molasses solubles, corn cob meal, corn gluten feed, corn germ meal, edible vegetable substances, soybean meal, dehulled soya flour, soybean mill feed, antibiotic mycelia, crushed limestone, soya grits and the like. It is preferred, although not essential, that the carrier be a nutritive one. Examples of typical feed supplements containing a benzimidazole of the present invention are:

(A)

| | Lbs. |
|---|---|
| 2-cyano-4,6,7-trichlorobenzimidazole | 10 |
| Wheat middlings | 90 |

(B)

| | |
|---|---|
| 2-cyano-4,5,6,7-tetrabromobenzimidazole | 5 |
| Corn gluten feed | 95 |

When employed as pesticides, the trihalo and tetrahalo benzimidazoles of this invention may be incorporated into pesticidal compositions in any of the usual ways either with or without wetting agents and inert diluents. The compositions can be in liquid or solid-dust form, the liquid form including emulsions. Such compositions can be formulated so as to contain from about 0.001% to about 50% of the active benzimidazole depending upon whether the composition is to be used as a concentrate or as an end use composition. For end use, the compositions conveniently are formulated so as to contain about 0.001% to about 1.0% of the benzimidazole.

Typical inert diluents with which the trihalo and tetrahalo benzimidazoles of this invention may be incorporated include, for example, clays, sands, talc, mica, fertilizers and the like, such compositions being in the form of dusts or larger particle size materials. Also, the benzimidazole may be dissolved in a water immiscible solvent, such as for example, a high boiling hydrocarbon, desirably containing emulsifying and wetting agents which compositions act as self-emulsifiable oils upon the addition of water. Typical emulsifying agents and wetting agents which may be employed in compounding either liquid or solid pesticidal formulations containing the benzimidazoles of this invention will include, for example, anionic compounds such as soaps, fatty sulfate esters and fatty aromatic sulfonates; nonionic wetting agents such as condensation products of fatty acids, fatty alcohols or fatty substituted phenols with ethylene oxide, or fatty esters of sugars or polyhydric alcohols, or block copolymers of ethylene oxide and propylene oxide; and cationic agents such as, for example, cetyl trimethylammonium bromide and the like.

The best mode contemplated by application for carrying out his invention is illustrated in the following examples, no limitation being intended except as set forth in the appended claims.

EXAMPLE 1

2-methyl-4,5,7-trichlorobenzimidazole

Mix 47.0 gms. of 3,4,6-trichloro-o-phenylenediamine, 500 ml. of acetic acid and 40.0 gms. of potassium acetate and reflux for 19 hours. Evaporate the reaction mixture and wash the residue with water. Recrystallize from ethyl acetate to obtain pure 2-methyl-4,5,7-trichlorobenzimidazole. (M.P. 292–293° C.)

EXAMPLE 2

2-styryl-4,5,7-trichlorobenzimidazole

Heat a mixture of 37.0 gms. of 2-methyl-4,5,7-trichlorobenzimidazole, 72.0 ml. of benzaldehyde and 4.0 ml. of piperidine at 200° C. for 20 hours in a sealed tube. Evaporate the reaction mixture and recrystallize the residue from methylene chloride to obtain 2-styryl-4,5,7-trichlorobenzimidazole. (M.P. 266.5–267.5° C.)

EXAMPLE 3

2-formyl-4,5,7-trichlorobenzimidazole (a) Stir at room temperature a mixture of 9.66 gms. 2 - styryl - 4,5,7 - trichlorobenzimidazole, 1.27 gms. of osmium tetraoxide, 12.8 gms. of sodium metaperiodate, 300 ml. of dimethoxymethane and 100 ml. of water for 24 hours, evaporate the reaction mixture. Dissolve the residue with water and extract with methylene chloride. Evaporate the methylene chloride extract to obtain 2-formyl-4,5,7-trichlorobenzimidazole. (M.P. 219–220° C.)

(b) Reflux a mixture of 8.0 gms. of 2-methyl-4,5,7-trichlorobenzimidazole, 4.0 gms. of selenium dioxide and 100 ml. of acetic acid for 4.5 hours. Filter and evaporate the filtrate. Dissolve the residue in benzene, filter and precipitate the 2-formyl-4,5,7-trichlorobenzimidazole by the addition of petroleum benzin. (M.P. 219–220° C.)

EXAMPLE 4

2-formyl-4,5,7-trichlorobenzimidazole oxime

Heat a solution of 6.0 gms. of 2-formyl-4,5,7-trichlorobenzimidazole, 6.0 gms. of hydroxylamine hydrochloride and 100 ml. of pyridine at 100° C. for 1.5 hours. Evaporate the reaction mixture, wash the residue with water and recrystallize from ether to obtain 2-formyl-4,5,7-trichlorobenzimidazole oxime. (M.P. 270–272° C.)

EXAMPLE 5

2-cyano-4,5,7-trichlorobenzimidazole

Reflux a solution of 1.28 gms. of 2-formyl-4,5,7-trichlorobenzimidazole oxime in 35.0 mls. of thionyl chloride for 2 hours. Evaporate the reaction mixture. Mix the residue with water and extract with methylene chloride. Evaporate the methylene chloride extract and recrystallize the residue from cyclohexane to obtain 2-cyano-4,5,7-trichlorobenzimidazole. (M.P. 208–209° C.)

By repeating the sequence of Examples 1–5 and substituting an equivalent quantity of any desired trihalo or tetrahalo o-phenylenediamine as the starting material in Example 1, there is produced the corresponding trihalo or tetrahalo 2-cyanobenzimidazole. Thus, for example, 3,4,5,6-tetrachloro-o-phenylenediamine,
3,4,6-tribromo-o-phenylenediamine,
3,4,5-triiodo-o-phenylenediamine and
3,4-dichloro-6-bromo-o-phenylenediamine may be treated according to Examples 1–5 to produce, respectively, 2-cyano-4,5,6,7-tetrachlorobenzimidazole,
2-cyano-4,5,7-tribromobenzimidazole,
2-cyano-4,5,6-triiodobenzimidazole and
2-cyano-4,5-dichloro-7-bromobenzimidazole.

EXAMPLE 6

4,5,7-trichloro-2-benzimidazolone

Pass phosgene for 10 mins. into a solution of 1.0 gm. of 3,4,6-trichloro-o-phenylenediamine and 25.0 ml. of acetic acid. Add ice water to the reaction mixture to precipitate 4,5,7-trichloro-2-benzimidazolone.

EXAMPLE 7

2,4,5,7-tetrachlorobenzimidazole

Reflux a mixture of 1.0 gm. of 4,5,7-trichloro-2-benzimidazolone and 25.0 ml. of phosphorusoxychloride for 20 hours. Evaporate the reaction mixture, wash the residue with ice water and recrystallize from ethanol to obtain 2,4,5,7-tetrachlorobenzimidazole. (M.P. 305–308° C.)

EXAMPLE 8

1-methoxymethyl-2,4,5(6),7-tetrachlorobenzimidazole

Add 5.0 gms. of chloromethyl methyl ether dropwise to a stirred solution of 10.4 gms. of 2,4,5,7-tetrachlorobenzimidazole and 2.5 gms. of sodium methoxide in 50 ml. of dimethylformide. Stir for 30 minutes and flood the reaction mixture with water. Separate the precipitate by filtration and recrystallize from hexane to obtain a mixture of the two isomers, 1-methoxymethyl-2,4,5(6),7-tetrachlorobenzimidazole. (M.P. 57–58° C.)

EXAMPLE 9

2-cyano-1-methoxymethyl-4,5(6),7-trichlorobenzimidazole

Mix 14.3 gms. of 1-methoxymethyl-2,4,5(6),7-tetrachlorobenzimidazole and 3.6 gms. of sodium cyanide in 50.0 ml. of dimethylformide and stir at room temperature for 20 hours. Add water and extract with ether. Evaporate the ether extract to obtain a mixture of isomeric products, 2-cyano-1-methoxymethyl-4,5(6),7-trichlorobenzimidazole. (M.P. 107–110° C.)

Separate the isomers by chromatography through silica eluting with a 20% mixture of ether in petroleum benzin. (M.P. 139–140° C.)

EXAMPLE 10

2-cyano-4,5,7-trichlorobenzimidazole

Dissolve 26.3 gms. of 2-cyano-1-methoxymethyl-4,5(6),7-trichlorobenzimidazole and 105.0 gms. of pyridine hydrochloride in 325.0 ml. of pyridine. Heat at 100° C. for one hour, dilute the reaction mixture with water and extract with ether. Evaporate the ether extract and recrystallize the residue from cyclohexane to obtain 2-cyano-4,5,7-trichlorobenzimidazole. (M.P. 210–212° C.)

By repeating the sequence of Examples 6–10 and substituting any desired trihalo or tetrahalo o-phenylenediamine for the 3,4,6-trichloro-o-phenylenediamine employed as the starting material in Example 6, there is produced the corresponding trihalo or tetrahalo 2-cyanobenzimidazole. Thus, for example, 3,4,5,6-tetrabromo-o-phenylenediamine,
3,4,5,6-tetrafluoro-o-phenylenediamine,
3,4,6-trifluoro-o-phenylenediamine and
3,4,5-trichloro-o-phenylenediamine may be treated according to Examples 6–10 to produce, respectively, 2-cyano-4,5,6,7-tetrabromobenzimidazole,
2-cyano-4,5,6,7-tetrafluorobenzimidazole,
2-cyano-4,5,7-trifluorobenzimidazole and
2-cyano-4,5,6-trichlorobenzimidazole.

EXAMPLE 11

2-trichloromethyl-4,5,6,7-tetrachlorobenzimidazole

Pass a stream of chlorine gas through a solution of 6.3 gms. of 2-trichloromethyl-benzimidazole in 140 ml. of acetic acid at 100° C. for 5 hours. Evaporate the solvent and recrystallize from methylene chloride to obtain 2-trichloromethyl-4,5,6,7-tetrachlorobenzimidazole. (M.P. 234–235° C.)

EXAMPLE 12

2-cyano-4,5,6,7-tetrachlorobenzimidazole

Add 2.0 gms. of 2-trichloromethyl-4,5,6,7-tetrachlorobenzimidazole to 10 ml. of concentrated aqueous ammonia. Stir for 10 minutes and separate the precipitate by filtration. Suspend the filtrate in water and acidify with acetic acid. Separate the precipitate by filtration and recrystallize from a mixture of benzene and petroleum benzene to obtain 2-cyano-4,5,6,7-tetrachlorobenzimidazole. (M.P. 285–287° C.)

EXAMPLE 13

2-(2'-thiazolin-2'-yl)-4,5,6,7-tetrachlorobenzimidazole

Add 1.49 gm. of 2-trichloromethyl-4,5,6,7-tetrachlorobenzimidazole to a mixture of 0.455 gm. of 2-mercaptoethylamine hydrochloride and .864 gm. of sodium methoxide in 25 ml. of ethanol. Stir at room temperature for 24 hours. Evaporate the solvent; wash the residue with water; and extract with methylene chloride. Evaporate the methylene chloride extract and recrystallize the residue from benzene to obtain 2-(2'-thiazolin-2-yl)-4,5,6,7-tetrachlorobenzimidazole. (M.P. 244–245° C.)

By substituting an equivalent quantity of any desired trihalo or tetrahalo 2-trichloromethyl-benzimidazole for the 2 - trichloromethyl-4,5,6,7-tetrachlorobenzimidazole used above, the corresponding 2-(2'-thiazolin-2'-yl)benzimidazole is produced.

EXAMPLE 14

2-mercapto-4,5,7-trichlorobenzimidazole

Add to a stirred mixture of 4.2 gm. of 3,4,6-trichloro-o-phenylenediamine in 60 ml. of acetic acid 2.7 gm. of thiophosgene. After 10 minutes, precipitate the product by pouring the reaction mixture into ice water. Separate the product by filtration and purify by recrystallization from ether to obtain 2-mercapto-4,5,7-trichlorobenzimidazole. (M.P. 222–224° C.)

EXAMPLE 15

2-methylmercapto-4,5,7-trichlorobenzimidazole

Reflux a mixture of 1.4 gm. of 2-mercapto-4,5,7-trichlorobenzimidazole, 0.44 gm. of methyliodide and 150 ml. of normal sodium hydroxide for 30 minutes. Cool the mixture and acidify with acetic acid. Separate the product by filtration and purify by recrystallization from methanol to obtain 2-methylmercapto-4,5,7-trichlorobenzimidazole. (M.P. 223° C.)

Substitution of an equivalent quantity of any desired loweralkyl halide for the methyliodide used above leads to the preparation of the corresponding 2 - loweralkylmercaptobenzimidazole.

EXAMPLE 16

2-methylsulfonyl-4,5,7-trichlorobenzimidazole

Add to a solution of 0.267 gm. of 2-mercapto 4,5,7-trichlorobenzimidazole in 50 ml. of methanol a solution of 0.45 gm. of m-chloro perbenzoic acid in 19 ml. of methylene chloride. Stir at room temperature for 1.5 hours and evaporate the solvent. Treat the residue with dilute aqueous sodium bicarbonate and separate the precipitate by filtration. Recrystallize from acetonitrile to obtain 2-methylsulfonyl - 4,5,7 - trichloro-benzimidazole. (M.P. 251.5–252.5° C.)

Any desired trihalo or tetrahalo 2-loweralkylsulfonylbenzimidazole may be prepared by treating the corresponding trihalo or tetrahalo 2-loweralkylmercaptobenzimidazole (prepared as in Examples 14 and 15) in the manner described above to effect oxidation of the mercapto group.

EXAMPLE 17

2-thiocarbamoyl-4,5,7-trichlorobenzimidazole

Pass hydrogen sulfide into a solution of 0.5 gm. of 2-cyano-4,5,7-trichloro-benzimidazole and 0.5 ml. of triethylamine in 3.5 ml. of pyridine for 5 minutes. Allow the mixture to stand at room temperature for 4 days. Add water and separate the precipitate by filtration. Recrystallize from ethanol-water to obtain 2-thiocarbamoyl-4,5,7-trichlorobenzimidazole. (M.P. 248–248.5° C.)

An equivalent quantity of any desired trihalo or tetrahalo 2-cyanobenzimidazole may be substituted for the 2-cyano-4,5,7-trichloro benzimidazole used above to prepare the corresponding 2-thiocarbamoylbenzimidazole.

EXAMPLE 18

Ethyl (4,5,7-trichlorobenzimidazole-2-yl) formimidate hydrochloride

Saturate with hydrogen chloride gas at 0° C. a solution of 0.6 gm. of 2-cyano-4,5,7-trichlorobenzimidazole in 25 ml. of ethanol and 25 ml. of ether. Allow to stand at 0 to 5° C. for 2 hours to obtain crude ethyl (4,5,7-trichlorobenzimidazole-2-yl) formimidate hydrochloride which is used without further purification in the reaction below.

EXAMPLE 19

2-(N-methylthiocarbamoyl)-4,5,7-trichlorobenzimidazole

Pass hydrogen sulfide gas into a solution of 1.0 gm. of ethyl (4,5,7-trichlorobenzimidazole-2-yl) formimide hydrochloride, obtained in Example 18, in 10 ml. of pyridine for 5 minutes. Allow to stand at room temperature for 1 hour and add 2.0 gm. of methylamine. Allow the mixture to stand at room temperature for 20 hours and add water. Separate the precipitate by filtration and purify by recrystallization from ethanol water to obtain 2-(N-methylthiocarbamoyl)-4,5,7-trichlorobenzimidazole.

Substitution of an equivalent quantity of any desired loweralkylamine for the methylamine used above leads to the preparation of the preparation of the corresponding 2-(N-loweralkylthiocarbamoyl)benzimidazole.

EXAMPLE 20

2-(N,N-diethylthiocarbamoyl)-4,5,7-trichlorobenzimidazole

Repeat the process of Example 19 substituting an equivalent quantity of diethylamine for the methylamine to obtain 2-(N,N-diethylthiocarbamoyl) - 4,5,7 - trichlorobenzimidazole.

Substitution of an equivalent quantity of any desired diloweralkylamine for the diethylamine used above leads to the preparation of the corresponding 2-(N,N-diloweralkylthiocarbamoyl)benzimidazole.

EXAMPLE 21

2-cyano-1-methoxymethyl-4,5,6,7-tetrachlorobenzimidazole

Add 105 mg. of chloromethyl methyl ether dropwise to a stirred solution of 281 mg. of 2-cyano-4,5,6,7-tetrachloro-benzimidazole and 60 mg. of sodium methoxide in 5 ml. of dimethylformamide. Allow the mixture to stand at room temperature for 3.5 hours and add water. Recover the precipitate by filtration and recrystallize from hexane to obtain 2 - cyano-1-methoxymethyl-4,5,6,7-tetrachlorobenzimidazole. (M.P. 128–129° C.)

An equivalent quantity of any desired haloloweralkyl loweralkylether may be substituted for the chloromethyl methyl ether used above to introduce the corresponding loweralkoxy loweralkyl group at the 1-position.

EXAMPLE 22

2-cyano-1-methyl-4,5(6),7-trichlorobenzimidazole

Add 150 mg. of methyliodide to a solution of 246 mg. of 2-cyano-4,5,7-trichlorobenzimidazole and 60 mg. of sodium methoxide in 2 ml. of dimethylformamide. Allow the mixture to stand at room temperature for 20 hours and add water. Recrystallize from cyclohexane to obtain 2-cyano-1-methyl-4,5(6),7-trichlorobenzimidazole. (M.P. 138–142° C.)

EXAMPLE 23

2-cyano-1-ethyl-4,5(6),7-trichlorobenzimidazole

Add 171 mg. of ethyliodide to a solution of 246 mg. of 2-cyano-4,5,7-trichlorobenzimidazole and 60 mg. of sodium methoxide in 3 ml. of dimethylformamide. Heat to 100° C. for 22 hours. Add water and separate the precipitate by filtration. Recrystallize from hexane to obtain 2-cyano-1-ethyl-4,5(6),7 - trichlorobenzimidazole. (M.P. 114–115° C.).

By repeating the process of Examples 21 or 22 and substituting an equivalent quantity of any desired loweralkyl halide or loweralkenyl halide for the methyliodide or ethyliodide as used in these examples, the corresponding loweralkyl or loweralkenyl group may be introduced at the 1-position.

EXAMPLE 24

2-cyano-1-methoxycarbonylmethyl-4,5(6),7-trichlorobenzimidazole

Reflux a mixture of 2.46 gm. of 2-cyano-4,5,7-trichlorobenzimidazole, 0.6 gm. of sodium methoxide and 1.53 gm. of methylbromoacetate in 250 ml. of methanol for 20 hours. Evaporate the solvent and recrystallize from cyclohexane to obtain 2-cyano-1-methoxycarbonylmethyl-4,5(6),7-trichlorobenzimidazole.

If desired, the two isomeric forms may be separated by chromatography over silica gel using 20% ether-petroleum benzin as the eluant.

An equivalent quantity of any desired loweralkylester of a loweralkanoic acid may be substituted for the methylbromoacetate used above to introduce the corresponding carboxyloweralkyl loweralkyl ester group at the 1-position.

EXAMPLE 25

1-carboxymethyl-2-cyano-4,5,7-trichlorobenzimidazole

Suspend 2.0 gm. of 2-cyano-1-methoxycarbonylmethyl-4,5,7-trichlorobenzimidazole in 100 ml. of normal sodium hydroxide. Stir for 10 minutes. Acidify the clear solution with acetic acid. Separate the precipitate by filtration and recrystallize from hexane to obtain 1-carboxymethyl-2-cyano-4,5,7-trichloro-benzimidazole.

By employing the hydrolysis technique described above, any of the trihalo or tetrahalo benzimidazoles of this invention having a carboxyloweralkyl loweralkyl ester group at the 1-position may be corrected into the corresponding 1-carboxyloweralkyl benzimidazole.

EXAMPLE 26

1-dimethylaminoethyl-2-cyano-4,5(6),7-tribromobenzimidazole

Reflux a solution of 246 mg. of 2-cyano-4,5,7-tribromobenzimidazole, 70 ml. of potassium ethoxide and 110 mg. of dimethylamino ethylchloride in 25 ml. of methanol for 20 hours. Evaporate the solvent and recrystallize the residue from cyclohexane to obtain 1-dimethylaminoethyl-2-cyano-4,5(6),7-tribromobenzimidazole.

If desired, the two isomeric forms may be separated by chromotography over silica gel using a 20% mixture of ether and petroleum benzin as the eluant.

An equivalent quantity of any desired diloweralkylaminoloweralkyl halide may be substituted for the dimethylamino ethylchloride used above to introduce the corresponding diloweralkylaminoloweralkyl group at the 1-position.

EXAMPLE 27

1-(2-aminoethyl)-2-cyano-4,5(6)-dichloro-7-bromobenzimidazole

Reflux a solution of 291 mg. of 2-cyano-4,5-dichloro-7-bromobenzimidazole, 60 mg. of sodium ethoxide and 240 mg. of N-bromoethylphthalimide in 25 ml. of methanol for 20 hours. Evaporate the solvent, wash the residue with water and recrystallize from methylene chloride to obtain 1-(2-N-phthalimidoethyl) - 2 - cyano - 4,5(6)-dichloro-7-bromobenzimidazole.

Reflux a solution of 1.0 gm. of the product obtained above, 1 ml. of 100% hydrazine hydrate and 25 ml. of ethanol for 1 hour. Evaporate the solvent. Extract the residue with dilute hydrochloric acid. Basify the extract with dilute sodium hydroxide. Separate the precipitate by filtration and recrystallize from cyclohexane to obtain 1-(2-aminoethyl)-2-cyano-4,5(6)-dichloro - 7 - bromobenzimidazole.

By substituting an equivalent quantity of any desired N-haloloweralkylphthalimide for the N-bromoethylphthalimide used above, the corresponding N-phthalimidoloweralkyl group may be introduced at the 1-position. Subsequent treatment with hydrazine hydrate, as described above, converts this group into the corresponding aminoloweralkyl group.

EXAMPLE 28

2-cyano-1-(2-hydroxyethyl)-4,5(6)-trichlorobenzimidazole

Add 125 mg. of 2-bromoethanol to a solution of 246 mg. of 2-cyano-4,5,7-trichlorobenzimidazole and 60 mg. of sodium methoxide in 20 ml. of dimethylformamide. Heat on a steam bath for 1 hour. Dilute the reaction mixture with water and separate the precipitate by filtration. Recrystallize from hexane to obtain 2-cyano-1-(2-hydroxyethyl)-4,5(6),7-trichlorobenzimidazole.

An equivalent quantity of any desired haloloweralkanol may be substituted for the 2-bromoethanol used above to introduce the corresponding hydroxyloweralkyl group at the 1-position.

EXAMPLE 29

2-cyano-1-(2-chloroethyl)-4,5(6),7-trichlorobenzimidazole

Reflux a solution of 500 mg. of 2-cyano-1-(2-hydroxyethyl) - 4,5(6),7 - trichlorobenzimidazole and 1 ml. of thionylchloride in 10 ml. of methylene chloride for one hour. Evaporate the solvent and recrystallize the residue from methanol to obtain 2-cyano-1-(2-chloroethyl)-4,5-(6),7-trichlorobenzimidazole.

Any of the trihalo or tetrahalo 1-hydroxyloweralkyl benzimidazole prepared as illustrated in Example 27 may be chlorinated as described above to obtain the corresponding 1-chloroloweralkyl benzimidazole.

EXAMPLE 30

2-cyano-1-(2-n-propylaminoethyl-4,5(6),7-trichlorobenzimidazole

Heat on a steam bath for 2 hours a solution of 325 mg. of 2-cyano - 1 - (2 - chloroethyl) - 4,5(6),7 - trichlorobenzimidazole and 59 mg. of n-propylamine in 5 ml. of n-propanol. Evaporate the solvent and recrystallize the residue from cyclohexane to obtain 2-cyano-1-(2-n-propylaminoethyl)-4,5(6),7-trichlorobenzimidazole.

An equivalent quantity of any desired loweralkylamine may be substituted for the n-propylamine used above to introduce the corresponding loweralkylaminoloweralkyl group at the 1-position.

EXAMPLE 31

1-acetyl-2-cyano-4,5(6),7-trichloro-benzimidazole

Heat for 4 hours at 100° C. a solution of 1.0 gm. of 2-cyano-4,5,7-trichlorobenzimidazole, 1 ml. of acetic anhydride and 1.0 gm. of sodium acetate in 5 ml. of pyridine. Flood the reaction mixture with water and separate the precipitate by filtration. Recrystallize from methanol to obtain 1-acetyl-2-cyano-4,5(6),7-trichlorobenzimidazole.

By substituting an equivalent quantity of any desired loweralkanoyl anhydride for the acetic anhydride used above, the corresponding loweralkanoyl group may be introduced at the 1-position.

Although Examples 20–30 have dealt specifically with the introduction of certain substituents at the 1-position of trihalo and tetrahalo 2-cyanobenzimidazoles, it will be understood by those skilled in the art that the same reactions may be employed to introduce these substituents at the 1-position of those trihalo and tetrahalo benzimidazoles of this invention wherein the substituent at the 2-position is thiocarbamoyl or the N-loweralkyl and N,N-diloweralkyl derivatives thereof, loweralkylmercapto, loweralkylsulfonyl or 2-thiazolin-2-yl; it being necessary merely to select the appropriate 2-substituted trihalo or tetrahalo benzimidazole as the starting material.

EXAMPLE 32

1-hydroxy-2-methyl-4,6,7-trichlorobenzimidazole

Add 17.5 gm. of sodium dithionite to a solution of 6.1 gm. of 2-nitro-3,4,6-trichloroacetanilide in 125 ml. of 10% aqueous sodium hydroxide at 35° C. and stir at room temperature for 44 hours. Acidify the reaction mixture with acetic acid and separate the precipitate by filtration. Recrystallize from ethylacetate to obtain 1-hydroxy-2-methyl-4,6,7-trichlorobenzimidazole. (M.P. 280–281° C.)

EXAMPLE 33

1-hydroxy-2-styryl-4,6,7-trichlorobenzimidazole

Heat a mixture of 5.0 gm. of 1-hydroxy-2-methyl-4,6,7-trichlorobenzimidazole, 15 ml. of benzaldehyde and 0.5 ml. of piperidine in a sealed tube for 18 hours at 175° C. Triturate the residue with hexane. Separate the insolubles by filtration and recrystallize from ether-hexane to obtain 1-hydroxy-2-styryl-4,6,7-trichlorobenzimidazole.

EXAMPLE 34

2-formyl-1-hydroxy-4,6,7-trichlorobenzimidazole

Stir a mixture of 2.5 gm. of 1-hydroxy-2-styryl-4,6,7-trichlorobenzimidazole, 50 mg. of osmium tetroxide, 550 mg. of sodium metaperiodate, 9 ml. of dimethoxyethane and 2 ml. of water for 20 hours at room temperature. Dilute the reaction mixture with water and extract with methylene chloride. Evaporate the extract and recrystallize the residue from ethylacetate to obtain 2-formyl-1-hydroxy-4,6,7-trichlorobenzimidazole.

EXAMPLE 35

2-formyl-1-hydroxy-4,6,7-trichlorobenzimidazole oxime

Heat a mixture of 200 mg. of 2-formyl-1-hydroxy-4,6,7-trichlorobenzimidazole, 1.0 gm. of hydroxylamine hydrochloride and 1 ml. of pyridine for 1 hour at 100° C. Dilute the reaction mixture with water and separate the precipitate by filtration. Recrystallize from hexane to obtain 2 - formyl - 1 - hydroxy - 4,6,7-trichloro-benzimidazole oxime.

EXAMPLE 36

2-cyano-1-hydroxy-4,6,7-trichlorobenzimidazole

Reflux a solution of 500 mg. of 2-formyl-1-hydroxy-4,6,7-trichlorobenzimidazole oxime in 10 ml. of thionylchloride for 30 minutes. Evaporate the reaction mixture and triturate the residue with water. Separate the insolubles by filtration and recrystallize from ethanol to obtin 2-cyano-1-hydroxy-4,6,7-trichlorobenzimidazole.

By repeating the sequence of Examples 31–35 and substituting an equivalent quantity of any desired trihalo or tetrahalo 2-nitroacetanilide for the 2-nitro-3,4,6-trichloroacetanilide starting material of Example 31, there is obtained the corresponding trihalo or tetrahalo 1-hydroxy-2-cyanobenzimidazole. Thus, for example, 2-nitro-3,4,5,6-tetrafluoroacetanilide,
2-nitro-3,4,5,6-trichloroacetanilide,
2-nitro-3,4,5-tribromoacetanilide and
2-nitro-3,4,6-triiodoacetanilide, respectively, may be treated as described in these examples to obtain 1-hydroxy-2-cyano-4,5,6,7-tetrafluorobenzimidazole,
1-hydroxy-2-cyano-4,5,6,7-tetrachlorobenzimidazole,
1-hydroxy-2-cyano-5,6,7-tribromobenzimidazole and
1-hydroxy-2-cyano-4,6,7-triiodobenzimidazole.

EXAMPLE 37

2-cyano-1-carboxymethoxy-4,6,7-tribromo-benzimidazole

Stir a mixture of 262 mg. of 2-cyano-1-hydroxy-4,6,7-tribromobenzimidazole, 55 mg. of sodium methoxide, 161 mg. of sodium bromoacetate and 2.5 ml. of dimethylformamide for 20 hours at room temperature. Dilute the reaction mixture with water and acidify with acetic acid. Separate the precipitate by filtration and recrystallize from ethylacetate to obtain 2-cyano-1-carboxymethoxy-4,6,7-tribromobenzimidazole.

By substituting an equivalent quantity of any desired haloloweralkanoic acid alkali metal salt for the sodium bromoacetate used above, the corresponding carboxyloweralkoxy group may be introduced at the 1-position.

EXAMPLE 38

2-cyano-1-ethoxycarbonylmethoxy-4,6,7-trichloro-benzimidazole

Reflux a mixture of 2.66 gm. of 2-cyano-1-hydroxy-4,6,7-trichlorobenzimidazole, 0.6 gm. of sodium methoxide and 1.53 gm. of ethyl bromoacetate in 250 ml. of methanol for 20 hours. Evaporate the solvent and recrystallize the residue from ether-petroleum benzin to obtain 2 - cyano-1-ethoxycarbonylmethoxy-4,6,7-trichlorobenzimidazole.

An equivalent quantity of any desired loweralkyl ester of a haloloweralkanoic acid may be substituted for the ethyl bromoacetate used above to introduce the corresponding loweralkoxycarbonylloweralkoxy group at the 1-position.

EXAMPLE 39

2-cyano-1-methoxy-4,6,7-triiodobenzimidazole

Stir a mixture of 370 mg. of 2-cyano-1-hydroxy-4,6,7-triiodobenzimidazole, 55 mg. of sodium methoxide, 125 mg. of methyliodide and 10 ml. of methanol at room temperature for 20 hours. Evaporate the solvent and triturate the residue with water. Separate the insolubles by filtration and recrystallize from ethylacetate to obtain 2-cyano-1-methoxy-4,6,7 triiodobenzimidazole.

Substitute an equivalent quantity of any desired loweralkylhalide for the methyliodide used above to introduce the corresponding loweralkoxy group at the 1-position.

EXAMPLE 40

2-cyano-1-(2-sulfoethoxy)-4,6,7-tribromo-benzimidazole

Repeat the process of Example 38 using 211 gm. of the sodium salt of 2-bromoethanesulfonic acid in place of the methyliodide and 316 mg. of 2-cyano-1-hydroxy-4,6,7-tribromobenzimidazole in place of the 2-cyano-1-hydroxy-4,6,7-triiodobenzimidazole to obtain 2-cyano-1-(2-sulfoethoxy)-4,6,7-tribromobenzimidazole.

An equivalent quantity of any desired alkali metal salt of a haloloweralkylsulfonic acid may be substituted for the sodium salt of 2-bromoethanesulfonic acid used above to introduce the corresponding sulfoloweralkoxy group at the 1-position.

EXAMPLE 41

2-cyano-1-(2-dimethylaminoethoxy)-4,6,7-trichlorobenzimidazole

Repeat the process of Example 38 using 262 mg. of 2-cyano-1-hydroxy-4,6,7-trichlorobenzimidazole in place of the 2-cyano-1-hydroxy-4,6,7-triiodobenzimidazole and 110 mg. of 2-dimethylaminoethyl chloride in place of the methyliodide to obtain 2-cyano-1-(2-dimethylaminoethoxy)-4,6,7-trichlorobenzimidazole.

Substitute an equivalent quantity of any desired diloweralkylaminoloweralkyl halide for the 2-dimethylaminoethyl chloride used above to introduce corresponding diloweralkylaminoloweralkoxy group at the 1-position.

EXAMPLE 42

2-cyano-1-(2-aminoethoxy)-4,6,7-trichloro-benzimidazole

Stir a solution of 262 mg. of 2-cyano-1-hydroxy-4,6,7-trichlorobenzimidazole, 55 mg. of sodium methoxide and 240 mg. of M-2-bromoethylphthalimide in 10 ml. of methanol at room temperature for 20 hours. Evaporate the solvent and triturate the residue with water. Separate the insolubles by filtration and recrystallize from hexane to obtain 2-cyano-1-(2-N-phthalimidoethoxy)-4,6,7-trichloro benzimidazole.

Reflux a solution of 500 mg. of 2-cyano-1-(2-N-phthalimidoethoxy)-4,6,7-trichlorobenzimidazole and 0.5 ml. of 100% hydrazine hydrate in 10 ml. of ethanol for 1 hour. Evaporate the reaction mixture and extract the residue with dilute hydrochloric acid. Basify the extract with aqueous sodium bicarbonate and separate the precipitate by filtration. Recrystallize from ether-petroleum benzin to obtain 2-cyano-1-(2-aminoethoxy)-4,6,7 - trichlorobenzimidazole.

By substituting an equivalent quantity of any desired N-haloloweralkylphthalimide for the N-2-bromoethylphthalimide used above, the corresponding N-phthalimidoloweralkoxy group may be introduced at the 1-position. Subsequent treatment with hydrazine hydrate in the manner described above converts this group into the corresponding aminoloweralkoxy group.

EXAMPLE 43

2-cyano-1-(2-hydroxyethoxy)-4,6,7-trichloro-benzimidazole

Add 125 mg. of 2-bromoethanol to a solution of 266 mg. of 2-cyano-1-hydroxy-4,6,7 - trichlorobenzimidazole and 60 mg. of sodium methoxide in 2 ml. of dimethylformamide. Heat the mixture on a steam bath for 1 hour. Dilute the reaction mixture with water and separate the precipitate by filtration. Recrystallize from cyclohexane to obtain 2-cyano-1-(2-hydroxyethoxy)-4,6,7 - trichlorobenzimidazole.

Substitution of an equivalent quantity of any desired haloloweralkanol for the 2-bromoethanol used above leads to the introduction of the corresponding hydroxylloweralkoxy group at the 1-position.

EXAMPLE 44

2-cyano-1-(2-chloroethoxy)-4,6,7-trichlorobenzimidazole

Reflux a solution of 500 mg. of 2-cyano-1-(2-hydroxyethoxy)-4,6,7-trichlorobenzimidazole and 1 ml. of thionylchloride in 10 ml. of methylene chloride for 1 hour. Evaporate the solvent and recrystallize the residue from ethylacetate to obtain 2-cyano-1-(2-chloroethoxy)-4,6,7-trichlorobenzimidazole.

Any trihalo or tetrahalo 2-cyano-1-(hydroxyloweralkoxy)benzimidazole as prepared according to Example 42 may be chlorinated by the technique described above to obtain the corresponding 1-(chloroloweralkoxy)benzimidazole.

EXAMPLE 45

2-cyano-1-(2-n-butylaminoethoxy)-4,6,7-trichlorobenzimidazole

Heat a solution of 325 mg. of 2-cyano-1-(2-chloroethoxy)-4,6,7-trichlorobenzimidazole and 73 mg. of n-butylamine in 5 ml. of ethanol on a steam bath for 2 hours. Evaporate the solvent and recrystallize the residue from hexane to obtain 2-cyano-1-(2-n-butylaminoethoxy)-4,6,7-trichlorobenzimidazole.

An equivalent quantity of any desired loweralkylamine may be substituted for the n-butylamine used above to introduce the corresponding loweralkylaminoloweralkoxy group at the 1-position.

EXAMPLE 46

2-cyano-4,5,7-trichlorobenzimidazole diethanolamine salt

Add a solution of 1.0 gm. of diethanolamine in 50 ml. of ehter and a few drops of methanol to a solution of 1.0 gm. of 2-cyano-4,5,7-trichloro-benzimidazole in 50 ml. of ether. Mix and add additional ether. Separate the precipitate and wash with ether to obtain 2-cyano-4,5,7-trichlorobenzimidazole diethanolamine salt. (M.P. 145–146° C. decomp.)

EXAMPLE 47

2-cyano-4,5,7-trichlorobenzimidazole L-arginine salt

Add 738 mg. of 2-cyano-4,5,7-trichlorobenzimidazole to a solution of 522 mg. of L-arginine in 500 ml. of boiling methanol. Evaporate the reaction mixture to a small volume and add ether. Separate the precipitate by filtration and wash with ether to obtain 2-cyano-4,5,7-trichlorobenzimidazole L-arginine salt. (M.P. 255–260° C. decomp.)

EXAMPLE 48

2-cyano-1-carboxymethoxy-4,6,7-trichlorobenzimidazole sodium salt

Add 54 mg. of sodium methoxide to a solution of 319 mg. of 2-cyano-1-carboxymethoxy - 4,6,7 - trichlorobenzimidazole in 5 ml. of methanol. Evaporate the solvent and wash the residue with ether to obtain 2-cyano-1-carboxymethoxy-4,6,7-trichlorobenzimidazole sodium salt.

EXAMPLE 49

2-cyano-1-(2-aminoethyl)-4,5,6,7-tetrachlorobenzimidazole hydrochloride

Treat a solution of 325 mg. of 2-cyano-1-(2-aminoethyl)-4,5,6,7-tetrachlorobenzimidazole in 10 ml. of methylene chloride with an excess of hydrogen chloride gas. Evaporate the solvent and wash the residue with ether to obtain 2-cyano-1-(2-aminoethyl)-4,5,6,7-tetrachlorobenzimidazole hydrochloride.

The subject matter which applicant regards as his invention is particularly pointed out and distinctly claimed as follows.

What is claimed is:

1. A compound selected from the group consisting of 2-substituted benzimidazoles having the formula:

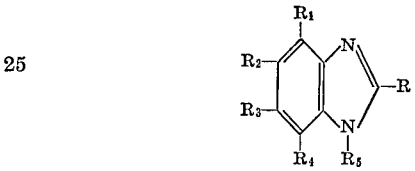

wherein R is cyano; $R_1$, $R_2$, $R_3$ and $R_4$ are members selected from the group consisting of hydrogen and halogen selected from the group consisting of fluorine, chlorine, bromine and iodine, provided that one of $R_1$, $R_2$, $R_3$ and $R_4$ can be hydrogen; and $R_5$ is a member selected from the group consisting of hydroxy; loweralkoxy, carboxyloweralkoxy and loweralkyl esters thereof sulfoloweralkoxy and aminoloweralkoxy each of from 2–6 carbon atoms in the alkoxy moiety and the N-loweralkyl and the N,N-diloweralkyl derivatives thereof; and alkali metal, alkaline earth metal and pharmaceutically acceptable amine salts thereof when $R_5$ is carboxyloweralkoxy or sulfoloweralkoxy, and salts thereof with pharmaceutically acceptable acids when $R_5$ is aminoloweralkoxy.

2. A compound of claim 1 wherein $R_1$, $R_2$, $R_3$ and $R_4$ are members selected from the group consisting of hydrogen and chlorine, provided that only one of $R_1$, $R_2$ $R_3$ and $R_4$ can be hydrogen.

References Cited

UNITED STATES PATENTS 3,429,890    2/1969    Sletzinger et al. _____ 260—309.2
3,576,818    4/1971    Samuel et al. _____ 260—309.2

OTHER REFERENCES

Takahashi et al.: Chem. Pharm. Bull. (Tokyo), vol. 16, pp. 527–38 (1968), RS1.C4.

NATALIE TROUSOF, Primary Examiner

U.S. Cl. X.R.

99—4; 260—240 D, 247.1, 247.2 R, 268 BC, 306.7; 424—270, 273